US011966900B2

(12) United States Patent
Xiao et al.

(10) Patent No.: US 11,966,900 B2
(45) Date of Patent: Apr. 23, 2024

(54) SYSTEM AND METHOD FOR DETECTING UNPAID ITEMS IN RETAIL STORE TRANSACTIONS

(71) Applicant: Walmart Apollo, LLC, Bentonville, AR (US)

(72) Inventors: Zhichun Xiao, Plano, TX (US); Lingfeng Zhang, Dallas, TX (US); Jon Hammer, Frisco, TX (US); Joseph Duffy, Plano, TX (US); Yao Liu, Richardson, TX (US); Sicong Fang, Dallas, TX (US); Xiang Yao, Santa Clara, CA (US); Pingyuan Wang, Dallas, TX (US); Yu Tao, Dallas, TX (US); Tianyi Mao, Dallas, TX (US); Yutao Tang, Allen, TX (US); Feiyun Zhu, Arlington, TX (US); Han Zhang, Dallas, TX (US); Chunmei Wang, Dallas, TX (US); Pingjian Yu, Plano, TX (US); Muzzammil Afroz, Frisco, TX (US); Haining Liu, Dallas, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/931,076

(22) Filed: Jul. 16, 2020

(65) Prior Publication Data
US 2021/0019725 A1 Jan. 21, 2021

Related U.S. Application Data
(60) Provisional application No. 62/876,072, filed on Jul. 19, 2019.

(51) Int. Cl.
G06Q 20/20 (2012.01)
G06N 3/08 (2023.01)

(52) U.S. Cl.
CPC ............ *G06Q 20/208* (2013.01); *G06N 3/08* (2013.01)

(58) Field of Classification Search
None
See application file for complete search history.

(56) References Cited

U.S. PATENT DOCUMENTS

| 5,804,807 A | 9/1998 | Murrah |
| 6,598,791 B2 | 7/2003 | Bellis, Jr. |

(Continued)

FOREIGN PATENT DOCUMENTS

| CA | 2868192 A1 * | 9/2013 | ............... G06K 5/00 |
| CN | 104217324 A * | 12/2014 | ........... G06Q 20/209 |

(Continued)

OTHER PUBLICATIONS

PCT; App No. PCT/US2020/60120; International Search Report and Written Opinion dated Mar. 12, 2021; (13 pages).

(Continued)

*Primary Examiner* — Ariel J Yu
(74) *Attorney, Agent, or Firm* — Foley IP Law, PLLC

(57) ABSTRACT

A transaction record is created showing a purchase transaction of a customer. A CV profile showing a list of items in the transaction obtained from images is also obtained. The items in the transaction record are compared to items on the list. When there is a discrepancy, an action to take is determined.

18 Claims, 5 Drawing Sheets

(56) References Cited

U.S. PATENT DOCUMENTS

| | | |
|---|---|---|
| 7,114,656 B1 | 10/2006 | Garver |
| 7,219,838 B2 | 5/2007 | Brewster |
| 7,780,081 B1* | 8/2010 | Liang ................ G06Q 30/0633 |
| | | 235/383 |
| 8,196,822 B2 | 6/2012 | Goncalves |
| 8,448,859 B2 | 5/2013 | Goncalves |
| 8,620,755 B1 | 12/2013 | Argue |
| 8,635,112 B1 | 1/2014 | Argue |
| 8,746,557 B2 | 6/2014 | Connell, II |
| 8,942,996 B2 | 1/2015 | Argue |
| 9,171,442 B2 | 10/2015 | Clements |
| 9,262,781 B2 | 2/2016 | Mackinnon |
| 9,311,645 B2 | 4/2016 | Edwards |
| 9,552,710 B2 | 1/2017 | Rasband |
| 9,892,438 B1 | 2/2018 | Kundu |
| 9,911,138 B2 | 3/2018 | Grabovski |
| 10,592,944 B2 | 3/2020 | Kundu |
| 2005/0189411 A1 | 9/2005 | Ostrowski |
| 2006/0032914 A1 | 2/2006 | Brewster |
| 2007/0080220 A1 | 4/2007 | Garver |
| 2010/0053329 A1* | 3/2010 | Flickner ............. G06Q 30/0603 |
| | | 348/150 |
| 2012/0041845 A1 | 2/2012 | Rothschild |
| 2012/0095853 A1* | 4/2012 | von Bose ........... G06Q 30/0641 |
| | | 705/16 |
| 2012/0173351 A1 | 7/2012 | Hanson |
| 2012/0188377 A1* | 7/2012 | Kundu ............. G08B 13/19673 |
| | | 348/150 |
| 2012/0320214 A1 | 12/2012 | Kundu |
| 2013/0018741 A1 | 1/2013 | Ostrowski |
| 2014/0067568 A1 | 3/2014 | Argue |
| 2014/0211017 A1 | 7/2014 | Argue |
| 2014/0214596 A1 | 7/2014 | Acker, Jr. |
| 2014/0316901 A1 | 10/2014 | Grabovski |
| 2017/0046707 A1 | 2/2017 | Krause |
| 2017/0161703 A1 | 6/2017 | Dodia |
| 2017/0323253 A1 | 11/2017 | Enssle |
| 2017/0337539 A1* | 11/2017 | Richards ............... G06T 7/0008 |
| 2018/0232796 A1 | 8/2018 | Glaser |
| 2019/0034897 A1 | 1/2019 | Gao |
| 2019/0043057 A1 | 2/2019 | Montgomery |
| 2019/0080277 A1* | 3/2019 | Trivelpiece .......... G06V 30/194 |
| 2019/0355049 A1 | 11/2019 | Kulkarni Wadhonkar |
| 2022/0383383 A1 | 12/2022 | Xiao |

FOREIGN PATENT DOCUMENTS

| | | | |
|---|---|---|---|
| CN | 207731310 U * | 8/2018 | ......... G06K 17/0022 |
| WO | 2015051303 A1 | 4/2015 | |
| WO | WO-2019062018 A1 * | 4/2019 | ............ G07G 3/003 |
| WO | 2021097019 | 5/2021 | |

OTHER PUBLICATIONS

USPTO; U.S. Appl. No. 17/775,414; Non-Final Rejection dated Apr. 21, 2023; (pp. 1-36).

* cited by examiner

SYSTEM AND METHOD FOR DETECTING UNPAID ITEMS IN RETAIL STORE TRANSACTIONS

CROSS-REFERENCE TO RELATED APPLICATION

This application claims the benefit of U.S. Provisional Application No. 62/876,072, filed Jul. 19, 2019, which is incorporated herein by reference in its entirety.

TECHNICAL FIELD

These teachings relate to approaches for reducing the amount of unpaid products (shrinkage) for retail stores.

BACKGROUND

Customers obtain retail products from various types of retail stores. The products are purchased at a point-of-sales device where a product's identifier (e.g., barcode) may be scanned in and the product is purchased. One type of point-of-sales arrangement is where an employee of the store scans the item and the transaction is completed. Another type of arrangement is where the customer goes to a self-checkout, scans the item in themselves, and then pays for the items in the transaction.

Unfortunately, sometimes all the items are not scanned by the customer at the self-checkout area. In one example, the customer forgets to scan an item (e.g., the item may be small, and the customer forgets to scan the item). In another example, the customer intentionally attempts to exit the store without paying for the item. Regardless of the reason, the non-scanned items can amount to significant losses for many retail stores.

BRIEF DESCRIPTION OF THE DRAWINGS

The above needs are at least partially met through the provision of approaches for reducing shrinkage losses in retail stores, wherein.

DETAILED DESCRIPTION

Figure 1:
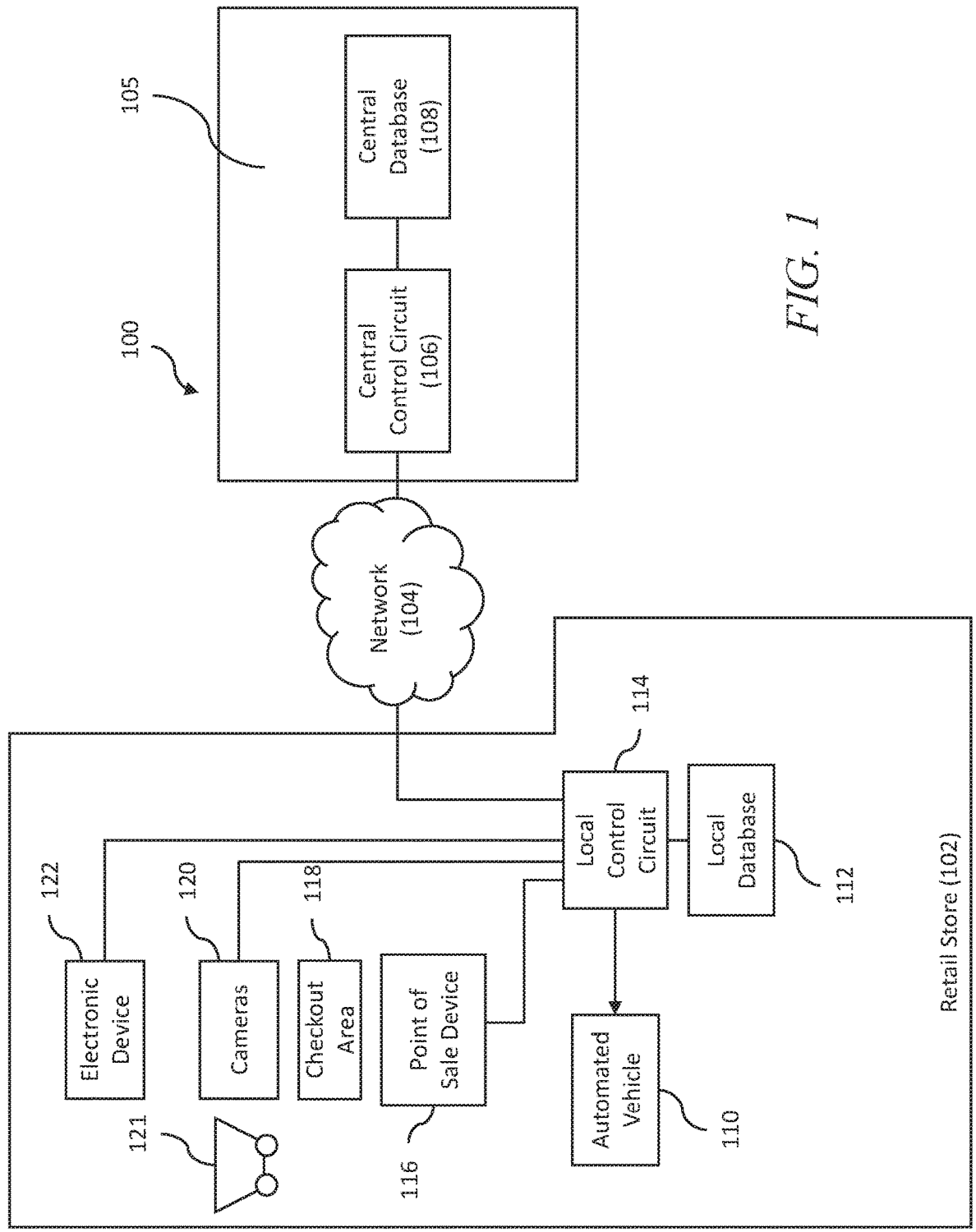
FIG. 1 comprises a diagram of a system as configured in accordance with various embodiments of these teachings.

Generally speaking, the present approaches reduce the amount of unpaid products exiting a retail store. In some aspects, multiple cameras scan items in a cart at the time a customer checks out at a point-of-sales. This creates a virtual receipt with items that the local control circuit identifies (henceforth, referred to as a computer vision (CV) profile or receipt) that is stored in the cloud. Timing information may be obtained including a timestamp or time range when the transaction occurred. The CV profile can be indexed and obtained by using the timing information and/or a unique transaction identifier. An electronic receipt of the actual transaction (with all the items purchased and their quantities) is also created at the store as a transaction record.

The customer additionally receives a paper receipt with the transaction number (e.g., a barcode), the timing information (such as a timestamp), and/or some other identifier (such as a QR code). Then, the customer leaves the store. An employee uses a portable scanner to scan the paper receipt. This obtains the transaction number and/or the timing information from the paper receipt.

In a first example, the transaction number is scanned from the paper receipt and is sent to the cloud. In this first example, the point-of-sale device instructs the local control circuit to obtain images of items in a cart of a customer (when the customer was at the checkout) from a start time of a transaction until the transaction is halted. A CV profile is created locally at the retail store and is sent to the cloud with the start and end time information. The start and end time information would also be known by the point-of-sale device. From the cloud, a central processor contacts the store to get the transaction information (an electronic transaction record that may also include the start and end time information) and uses the timing information to access the CV profile. A comparison is made as between the items on the CV profile and the electronic transaction record. If there is a discrepancy an action can be taken. For example, the store employee may be informed, a robot may be used to take the items back, or the items can be paid for by the customer.

In another and second example, the transaction number is scanned from the paper response and is sent to a central processing center at the cloud. The CV profile includes a unique transaction identifier. The unique transaction identifier (ID) (e.g., an alpha-numeric string, not the same as the transaction number) is generated for this transaction by the retail store (e.g., the point of sales device or a local processor) and included in the CV profile. The transaction number and the transaction ID are also sent to the central processing center (by the point-of sales device) as part of an electronic transaction record.

In the second example, the local control circuit proactively sends all the results, including the electronic transaction records (with transaction number and transaction ID) and CV profiles, to the central control unit at the central processing center. The electronic transaction record is obtained by the transaction number scanned from the paper receipt at the store. Once the transaction record is obtained, the transaction ID is obtained since the transaction ID is in the transaction record. A comparison can then be made at the central processing center between the CV profile and the transaction record.

Also, in the second example, the comparison process can be completed before the customer arrives at the exit of the store. The time to complete the process can also be performed in a small amount of time (e.g., less that a second), even before the customer physically leaves the point-of-sales area, allowing actions to be potentially taken there and then. In some aspects, when the customer leaves the store and the paper receipt is scanned, discrepancies can already have been determined; in this case the scanning serves as a trigger to instigate any needed actions.

In aspects, customers will be informed that there are cameras in the store. The store may inform the customers according to various mechanisms including signs in the store. If the retail store is a members-only store, the notification may be included in the membership agreement the customer signs in order to become a member of the store.

In other aspects, store employees or associates are trained to handle situations when a discrepancy is found. For example, store employees or associates may be trained as to how to approach and speak to customers that apparently have an unpaid for or unscanned item. A store process may also be put into place detailing how store employees are to handle various situations where discrepancies exist.

In many of these embodiments, a system comprises a retail store, a shopping cart, one or more cameras, an electronic network, a central database, a local database, a local control circuit, a central control circuit, and a point-of-sales device.

The shopping cart has a plurality of items that are to be purchased by a customer at the retail store. The one or more cameras are deployed at the retail store and obtain a continuous stream of images of items in the shopping cart and that are associated with transaction time information.

The central database is disposed at a central processing center and a local database is disposed at the retail store. The local control circuit is coupled to the electronic network and to the local database, and a central control circuit is coupled to the electronic network and the central database.

The point-of-sales device records a sales transaction of a customer as the customer purchases the items in their shopping cart at the retail store, processes payments and keeps records of all information including the transaction number, the transaction ID and timestamp. The customer obtains a paper receipt of the transaction including, in some aspects, the barcode or QR code for the transaction number. The point-of-sales device creates an electronic transaction record identified by the transaction number. The electronic transaction record is stored at the local database.

The local control circuit is configured to: receive the continuous streams of images from the one or more cameras, analyze the images to determine items in the cart, responsively create a computer vision (CV) profile listing the items and quantities in the cart, the CV profile being identified by either the transaction ID or the transaction time information (and point-of-sales id, in some examples).

The central control circuit is configured to: receive the CV profile from the network and store it in the central database, receive the transaction number and the transaction time information from a mobile electronics device at the store or from the point-of-sales device via the electronic network, and send to the local control circuit in the retail store an electronic message requesting the transaction record having the transaction number.

The local control circuit is configured to: retrieve the transaction record using the transaction number and transmit the transaction record over the network to the central control circuit. The central control circuit is further configured to: responsively receive the transaction record via the electronic network, retrieve the CV profile from the central database using the transaction time information, compare items on the CV profile to the items on the transaction record, and when there is a discrepancy, determine an action to take.

The action is taken and the action is one or more of: sending an electronic alert to the store employee, sending electronic information to the electronics device showing the discrepancy, sending a control signal to activate a warning indicator at the exit of the store, or sending a control signal to instruct an automated vehicle to retrieve an unpaid item from a customer and return the item to the retail store.

In aspects, the mobile electronics device is used by an employee of the retail store, and the employee is stationed at an exit of the retail store. The mobile electronics device includes an electronic sensor that is configured to electronically scan the paper receipt to obtain the transaction time information and the transaction number.

In examples, the information showing the discrepancy includes one or more of a list of unpaid items or images of the unpaid items. In other examples, the local control circuit determines a probability that the image includes a predetermined item.

In other aspects, at the start of the transaction the point-of-sales device sends a message to the local control unit to start obtaining and analyzing the images of the checkout area, and at the end of the transaction the point-of-sales device sends another message to end the stream of images and analysis. In still other examples, the local control circuit analyzes the images using one or more convolutional neural networks (CNNs).

In still other aspects, the warning indicator is a visual indicator or an audio indicator. In yet other examples, the automated vehicle is an aerial drone or an automated ground vehicle.

In others of these embodiments, a retail store, a shopping cart, one or more cameras, an electronic network, a central database, a local database, a local control circuit, a central control circuit, and a point-of-sales device are provided.

The shopping cart has a plurality of items that are to be purchased by a customer at the retail store. The one or more cameras are deployed at the retail store, and the one or more cameras obtain one or more images of items in the shopping cart and are associated with transaction time information.

The central database is disposed at a central processing location or center, and the local database is disposed at the retail store. The local control circuit is coupled to the electronic network and to the local database. The central control circuit is coupled to the electronic network and the central database.

The point-of-sales device records a sales transaction of a customer as the customer purchases the items in their shopping cart at the retail store. The customer obtains a paper receipt of the transaction including the transaction time information and a transaction number. The point-of-sales device creates an electronic transaction record identified by the transaction number, and the transaction record is sent to the central database.

At the local control circuit, the one or more images are received from the one or more cameras, the images are analysed to determine the items in the cart, and a computer vision (CV) profile listing the items in the cart is responsively created. The CV profile is identified by the transaction time information, and if available, the transaction number or ID. A checkout register number (or other identifier) identifying which checkout was used may also be included.

At the central control circuit, the CV profile is received from the network and the CV profile is stored in the central database. The transaction number and transaction time information are received from a mobile electronics device or from the point-of-sales device via the electronic network.

At the local control circuit, the transaction record is retrieved using the transaction number; and the record is transmitted over the network to the central control circuit. At the central control circuit, the transaction record is responsively received via the electronic network, the CV profile is retrieved from the central database using the transaction time information, and items on the CV profile are compared to the items on the transaction record. When the comparison indicates a discrepancy, an action to take is determined.

The action is taken and the action is one or more of: sending an electronic alert to the store employee, sending electronic information to the electronics device showing the discrepancy, sending a control signal to a activate a warning indicator at the exit of the store, or sending a control signal to instruct an automated vehicle to retrieve an unpaid item from a customer and return the item to the retail store. Other examples of actions are possible.

In still others of these embodiments, a system includes a shopping cart, one or more cameras, an electronic network, a central database, a local database, a local control circuit, a central control circuit, a mobile electronics device, and a point-of-sales device.

The shopping cart has a plurality of items that are to be purchased by a customer at a retail store. The one or more cameras are deployed at the retail store, and the one or more cameras obtain one or more images of items in the shopping cart. The central database is disposed at a central processing center and the local database is disposed at the retail store. The local control circuit is coupled to the electronic network and to the local database and the central control circuit coupled to the electronic network and the central database.

The point-of-sales device records a sales transaction of a customer as the customer purchases the items in their shopping cart at the retail store. The customer obtains a paper receipt of the transaction including a transaction number and a barcode representing the transaction number, the point-of-sales device creating an electronic transaction record identified by the transaction number, the electronic transaction record being stored at the local database and sent to the central processing center for storage at the central database.

The mobile electronics device is used by an employee of the retail store. The employee is stationed at an exit of the retail store. The mobile electronics device includes an electronic sensor that is configured to electronically scan the barcode to obtain the transaction number and send to the central processing center.

The local control circuit is configured to: receive the one or more images from the one or more cameras, analyze the images to determine items in the cart, responsively create a computer vision (CV) profile or receipt listing the items in the cart, the CV profile being associated with and identified by the transaction identifier and send the CV profile to the central processing center. A point-of-sale register number (or other identifier) identifying which checkout was used may also be included in the CV profile.

The central control circuit is configured to: receive the transaction number from the mobile electronics device via the electronic network, retrieve the transaction record from the central database using the transaction number, retrieve the transaction identifier from the transaction record, retrieve the CV profile from the central database using the transaction identifier, compare items on the CV profile to the items on the transaction record, and when there is a discrepancy, determine an action to take. The action is taken and the action is one or more of: sending an electronic alert to the store employee, sending electronic information to the electronics device showing the discrepancy, sending a control signal to a activate a warning indicator at the exit of the store, or sending a control signal to instruct an automated vehicle to retrieve an unpaid item from a customer and return the item to the retail store.

Referring now to FIG. 1, one example of a system that reduces unpaid for items leaving retail stores is described. The system 100 includes a retail store 102 (including an automated vehicle 110, a local database 112, a local control circuit 114, a point-of-sales device 116, a checkout area 118, one or more cameras 120, and an electronic device 122), a network 104, and a central control processing center or location 105 (including a central control circuit 106 and a central database 108).

The retail store 102 is any type of retail store with product display units (e.g., shelving units or other product displays) that present for sale any type of merchandise for customers. The central control processing center or location 105, in one example, is in the cloud or any other central location. The automated vehicle 110 is any type of automated vehicle such as an aerial drone or an automated ground vehicle. The local database 112 and the central database 108 are any type of electronic memory storage devices.

The point-of-sales device 116 is any type of electronic device that is used to scan in the items to be paid for by customers at the checkout area 118, to determine a total monetary value for these items, and to allow a customer to pay for these items. In aspects, the point-of-sales device 116 includes a scanner that allows a customer (or store employee) to scan in identification information for an item to allow the customer to purchase the item.

The checkout area 118 is any area of the retail store 102 where a customer can check out and pay for their purchases. In aspects, the checkout area 118 is a self-checkout where the customer scans in their item with little or no assistance from employees of the store.

The one or more cameras 120 are any type of imaging devices or scanners that capture any type of image. For example, the one or more cameras capture visible light images of the items in shopping carts of customers at the checkout area. In aspects, customers are informed about the presence of the cameras. For example, a sign at the entrance of the retail store 102 may inform customers about the presence of cameras. In other examples and when the retail store is a members-only store, the customer may be informed about the presence of cameras when they become members (e.g., sign a written agreement).

The electronic device 122 is any type of electronic device such as a smartphone, tablet, laptop, or cellular phone that can be used by an employee, for example, at the exit of the store. The employee may scan in information from the device 122 and/or receive information (e.g., alerts). The electronic device, in examples, is portable. In aspects, the electronics device 122 includes an electronic sensor that is configured to electronically scan the barcode or QR code on the paper receipt to obtain the transaction time information and the transaction number.

The network 104 is any type of electronic communication network such as the internet, a wireless network, a wide area network, or a combination of these or other types of networks.

It will be appreciated that as used herein the term "control circuit" refers broadly to any microcontroller, computer, or processor-based device with processor, memory, and programmable input/output peripherals, which is generally designed to govern the operation of other components and devices. In addition, a graphical processing unit (GPU) can be used. It is further understood to include common accompanying accessory devices, including memory, transceivers for communication with other components and devices, etc. These architectural options are well known and understood in the art and require no further description here. The control circuits 106 and 114 may be configured (for example, by using corresponding programming stored in a memory as will be well understood by those skilled in the art) to carry out one or more of the steps, actions, and/or functions described herein.

In one example of the operation of the system of FIG. 1, a shopping cart 121 has a plurality of items that are to be purchased by a customer at the retail store 102 at the checkout area 118. The cameras 120 obtain one or more images of items in the shopping cart 121 and the images are associated with transaction time information. In examples, the transaction time information may be a timestamp (e.g., date, hour, minute, second). In other examples, the transaction time information may be a start time and/or an end time for the transaction or a time range. By "transaction," it is meant the process by which a customer scans or records the items they are purchasing and then purchases these items.

In parallel with the cameras obtaining the images of the items in the cart 121 (e.g., at the same time or roughly the same time), the point-of-sales device 116 records the sales transaction of a customer as the customer purchases the items in their shopping cart 121 at the retail store 102 and obtains the transaction time information. In some aspects, the customer obtains a paper receipt of the transaction including the transaction time information and a transaction number. Some or all of this information may be included in a barcode. The point-of-sales device 116 creates an electronic transaction record (e.g., of any suitable electronic format or data structure) identified by the transaction number. The electronic transaction record is stored at the local database 112.

The local control circuit 114 is configured to receive the one or more images from the cameras 120, analyze the images to determine items in the cart 121, and responsively create a computer vision (CV) profile or receipt listing the items in the cart. The CV profile is identified by the transaction time information and includes a list of items in any format. A point-of-sale register number (or other identifier) identifying which checkout was used may also be included.

The central control circuit 106 is configured to: receive the CV profile from the network 104 and store the CV profile in the central database 108, receive the transaction number and the transaction time information from a mobile electronics device 122 at the store 102 or from the point-of-sales device 116 via the electronic network 104, and send to the local control circuit 114 in the retail store 102 an electronic message requesting the transaction record having the transaction number.

The local control circuit 114 is configured to: retrieve the transaction record using the transaction number and transmit the transaction record over the network 104 to the central control circuit 106. The transaction record includes a list of items paid for by the customer. The central control circuit 106 is further configured to: responsively receive the transaction record via the electronic network 104, retrieve the CV profile from the central database 108 using the transaction time information, compare items on the CV profile to the items on the transaction record, and when there is a discrepancy, determine an action to take. In aspects, control logic maps the transaction time information to the CV profile. In examples, the information showing the discrepancy includes one or more of a list of unpaid items or images of unpaid items. In other examples, the local control circuit 114 determines a probability that the image includes a predetermined item.

The action is taken and the action is one or more of: sending an electronic alert to the store employee, sending electronic information to the electronics device 122 showing the discrepancy, sending a control signal to a activate a warning indicator at the exit of the store 102, or sending a control signal to instruct the automated vehicle 110 to retrieve an unpaid item from a customer and return the item to the retail store 102. In still other aspects, the warning indicator is a visual indicator or an audio indicator.

In other aspects, the point-of-sales device 116 instructs the cameras 120 to obtain the images at the beginning of a transaction. In still other examples, the local control circuit 114 analyzes the images using one or more convolutional neural networks (CNNs).

In yet other aspects, when the point-of-sales device 116 starts operating a transaction, it sends a signal to the local control circuit 114 to start taking in images and analyzing, generating the CV profile, all at the request of the point-of-sales device 116. When the transaction finishes or cancels, a stop signal is received by the local control circuit 114 or the central control circuit 106. Thus, the transaction number, and the exact transaction start and end time associated with this particular CV profile are known. The comparison can be done immediately, before the employee at the exit scans the paper receipt. In other examples, an alert can be sent to an employee or the point-of-sales device before the customer leaves the checkout area 118.

In another example, the point-of-sales device 116 records a sales transaction of a customer as the customer purchases the items in their shopping cart 121 at the retail store 102. The customer obtains a paper receipt of the transaction including a transaction number and a barcode representing the transaction number. The point-of-sales device 116 creates an electronic transaction record identified by the transaction number or transaction ID (also created by the point-of-sales device 116). The electronic transaction record is stored at the local database 112 and sent to the central processing center 105 for storage at the central database 108.

The mobile electronics device 122 is used by an employee of the retail store 102, and the employee is stationed at an exit of the retail store 102. The mobile electronics device 122 includes an electronic sensor that is configured to electronically scan the barcode to obtain the transaction number and send the transaction number to the central processing center 105.

The local control circuit 114 is configured to: receive the one or more images from the one or more cameras 102, analyze the images to determine items in the cart 121, responsively create a computer vision (CV) profile listing the items in the cart, the CV profile being associated with and identified by the transaction identifier;

The central control circuit 106 is configured to: receive the transaction number from the mobile electronics device 122 via the electronic network 104, retrieve the transaction record from the central database 108 using the transaction number, retrieve the transaction identifier from the transaction record, retrieve the CV profile from the central database 108 using the transaction identifier, compare items on the CV profile to the items on the transaction record, and when there is a discrepancy, determine an action to take.

The action is taken and the action is one or more of: sending an electronic alert to the store employee, sending electronic information to the electronics device showing the discrepancy, sending a control signal to activate a warning indicator at the exit of the store, or sending a control signal to instruct an automated vehicle 110 to retrieve an unpaid item from a customer and return the item to the retail store 102.

In other examples, various messages may be sent, for example, from the central control circuit 106 and/or the local control circuit 114. For example, a message may be sent to a self-checkout monitoring employee at checkout area 118 (where checkout area 118 is a self-checkout). The message may specify that there is a problem at this particular self-checkout area and that the employee should investigate.

In another example, a message may be sent to an exit greeter that there is a problem (e.g., a discrepancy has been detected). For example, the message may be sent from the central control circuit 106 and/or the local control circuit 114 to a greeter positioned at the exit of the store where the greeter has a portable electronic device to receive the message. The message may specify the type of item suspected of causing the discrepancy (e.g., a box of breakfast cereal that was not scanned), or information that might identify the purchaser (e.g., when the transaction occurred).

In yet another example, a message that there is a problem to a sales associate may be sent. For example, the message may be sent from the central control circuit 106 and/or the local control circuit 114 to any appropriate sales associate in the store. The message may identify other details concerning the discrepancy such as the item that is suspected of being unscanned.

In yet another example, a message may be sent to the customer. For example, a display may be disposed in the checkout area 118 that might display a message to the member such as "Did you forget to scan the breakfast cereal?" when it is suspected the customer forgot to scan a package of breakfast cereal.

Figure 2:
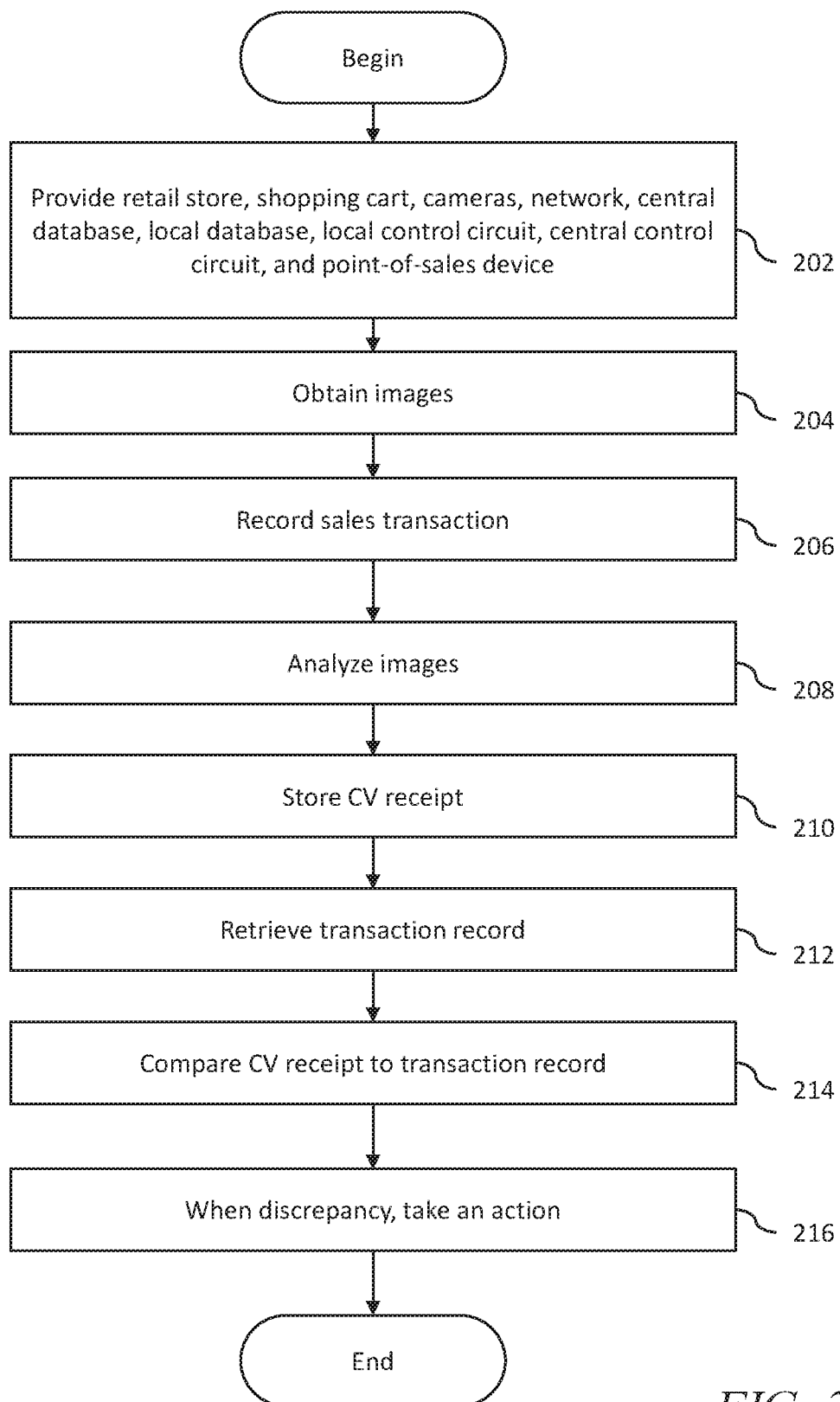
FIG. 2 comprises a flowchart as configured in accordance with various embodiments of these teachings.

Referring now to FIG. 2, one example of an approach for the number of unpaid items leaving retail stores is described. At step 202, a retail store, a shopping cart, one or more cameras, an electronic network, a central database, a local database, a local control circuit, a central control circuit, and a point-of-sales device are provided. The shopping cart has a plurality of items that are to be purchased by a customer at the retail store. Alternatively, the customer may carry the items by hand or in a shopping basket. The central database is disposed at a central processing location or center, and the local database is disposed at the retail store. The local control circuit is coupled to the electronic network and to the local database. The central control circuit is coupled to the electronic network and the central database.

At step 204, the cameras obtain one or more images of items in the shopping cart and are associated with transaction time information. Various types of cameras, for example, cameras obtaining images in visible light may be used.

At step 206, the point-of-sales device records a sales transaction of a customer as the customer purchases the items in their shopping cart at the retail store. For example, the transaction may occur at a self-checkout and the customer may scan the barcode, or manually enter a numerical code, for each merchandise in order to complete their transaction. In aspects, the customer obtains a paper receipt of the transaction including the transaction time information and a transaction number (e.g., in a barcode). The point-of-sales device creates an electronic transaction record identified by the transaction number, and the transaction record is stored at the local database.

At step 208 and at the local control circuit, the one or more images are received from the cameras. The images are analyzed (e.g., using computer vision (CV)-related software) to determine the identity of items in the cart, and a CV profile or receipt listing the items in the cart is responsively created. The CV profile is identified by the transaction time information. For example, images of known products are compared to the images of items in the cart. In another example, other item identification information (item numbers, shapes, and so forth) may be used to identify a certain product.

At step 210 and at the central control circuit, the CV profile is received from the network and the CV profile is stored in the central database. The transaction number and transaction time information are also received from a mobile electronics device or from the point-of-sales device via the electronic network, and an electronic message is sent to the local control circuit in the retail store requesting the transaction record having the transaction number.

At step 212 and at the local control circuit, the transaction record is retrieved using the transaction number; and the record is transmitted over the network to the central control circuit.

At step 214 and at the central control circuit, the transaction record is responsively received via the electronic network, the CV profile is retrieved from the central database using the transaction time information, and items on the CV profile are compared to the items on the transaction record.

At step 216 and when the comparison indicates a discrepancy (the items in the CV profile do not match items in the transaction record), an action to take is determined. The action is taken and the action is one or more of: sending an electronic alert to the store employee, sending electronic information to the electronics device showing the discrepancy, sending a control signal to a activate a warning indicator at the exit of the store, or sending a control signal to instruct an automated vehicle to retrieve an unpaid item from a customer and return the item to the retail store.

For example, a message may be sent to a self-checkout monitoring employee at a self-checkout area. The message may specify that there is a problem at this particular self-checkout area and that the employee should investigate. Information concerning the problem may be sent in the message.

In other examples, a message may be sent to an exit greeter that there is a problem (discrepancy that has been detected). For example, the message may be sent from to a greeter or other employee positioned at the exit of the store where the greeter has a portable electronic device (e.g., smartphone, laptop, or tablet) to receive the message. The message may specify the type of item suspected of causing the discrepancy (e.g., a box of breakfast cereal that was not scanned), or information that might identify the purchaser (e.g., when the transaction occurred or other transaction information).

In yet other examples, a message that there is a problem to a sales associate or employee, where the sales associate or employee is positioned anywhere in the store or even at a remote location. For example, the message may alert the employee to take an action or suggest the action to take.

In yet another example, a message may be sent directly to the customer. For example, a display may be disposed in s self-checkout area that is configured to display a message to the member such as "Did you forget to scan the soft drink bottle?" when it is suspected the customer forgot to scan this item.

Other examples of actions are possible.

Figure 3:
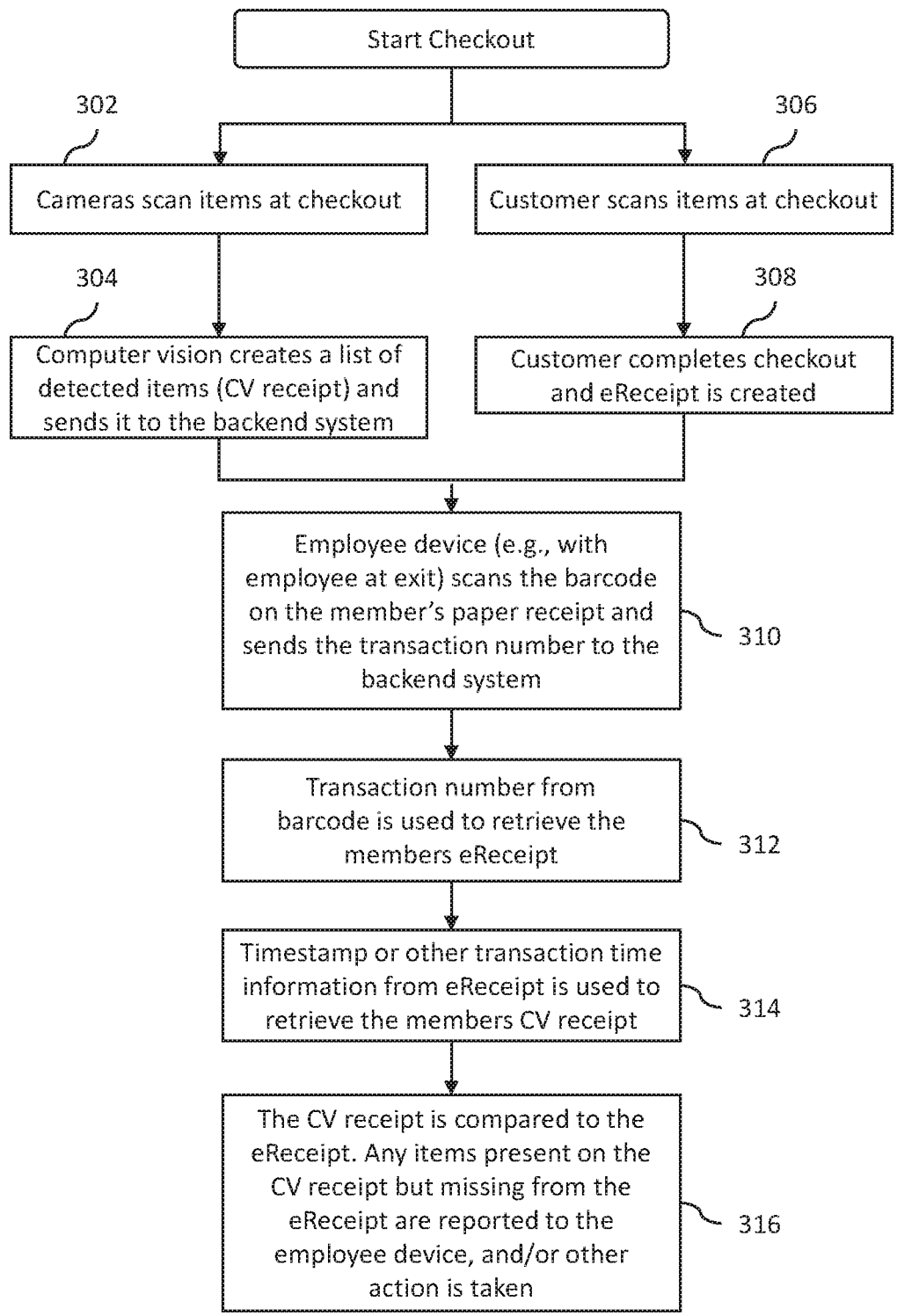
FIG. 3 comprises a flowchart as configured in accordance with various embodiments of these teachings.

Referring now to FIG. 3, one example of an approach for reducing the number of unpaid items leaving a retail store is described. At step 302, a camera (or cameras) scans items at the checkout area of the store. In examples, the items are in the cart of a customer.

At step 304, analysis of the images occurs and a list of the items in the cart is created. In one example, computer vision software is used to create a list of the detected items (e.g., in the form of a CV profile or receipt) and the list is sent to a processing device in the cloud. In aspects, the CV profile includes transaction time information (e.g., when the transaction occurred such as a timestamp).

At step 306 (and in parallel with steps 302 and 304), the customer scans the items in their cart at the checkout. A scanner that scans a barcode on the items or other identification information on the items may be used.

At step 308 (and in parallel with steps 302 and 304), the customer completes their checkout of the items. An electronic receipt with the transaction number is created and the electronic receipt includes the items that were paid for by the customer. In aspects, a paper receipt may also be created and given to the customer. In other aspects, the paper receipt is shown to an employee of the store as the customer leaves the store.

At step 310, the employee at the exit scans the barcode or QR code on the paper receipt and obtains the transaction number and/or the timestamp (or other transaction timing information such as the start time and the end time of the transaction).

At step 312, the transaction number (e.g., obtained from the scanned barcode) is used to retrieve the electronic receipt. In examples, the processor in the cloud sends instructions to another processor at the local store to retrieve the electronic receipt. At step 314, the transaction time information (e.g., a timestamp) is used in the cloud to retrieve the CV profile.

At step 316, the CV profile is compared to the electronic receipt. Any items present on the CV profile but missing from the electronic receipt (transaction record) are reported (as a discrepancy) to the employee at the exit of the store and/or some other action may be taken.

Figure 4:
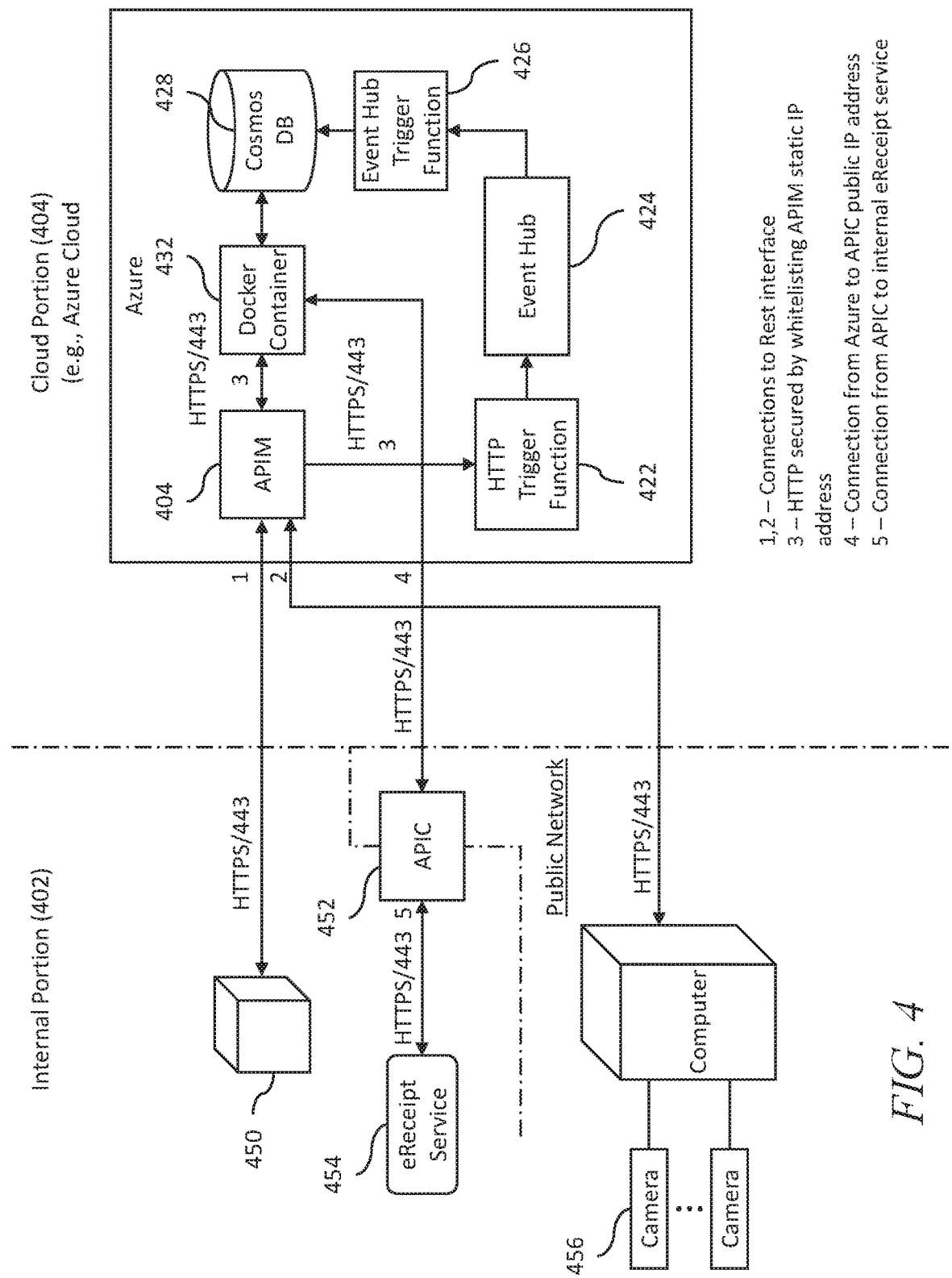
FIG. 4 comprises a diagram of aspects of a system as configured in accordance with various embodiments of these teachings.

Referring now to FIG. 4, one example of a system that determines unpaid items before the items leave a store is described in more detail. The system includes a local portion 402 and a cloud portion 404. Elements in the local portion 402 are disposed at a retail store and elements in the cloud portion are disposed in the cloud, in one example, on Microsoft Azure cloud service.

The cloud portion 404 includes an interface 420 (e.g., an APIM interface, which is a gatekeeper that handles HTTP communications to elements outside the cloud portion 404), an HTTP trigger function 422 (which receives data and determines an action to take based upon the content of the data), an event hub 424 (which pushes data to different destinations), an event hub trigger function 426 (which performs functions to get data to a database), a database 428 (which stores data), and a docker container 432 (which obtains and stores data from the database 428).

A scanner 450 scans codes (e.g., at the door or at the point-of-sales device). A bridge 452 (e.g., an APIC device) is an interface between the cloud portion 404 and a receipt service 454 where the transaction records are stored. Cameras 456 obtain images that are forwarded to computer 458 that are forwarded to the cloud portion.

The docker container 432 includes the logic described herein to do the comparisons. The transaction number goes to the docker container 432. The docker container 432 needs to know the actual electronic transaction record and requests the interface (APIC) 452 obtain the record. The request is received at the interface 452. The interface 452 obtains the actual transaction record or receipt (e.g., UPC number and quantities purchased). This information is returned to the docker container 432. The docker container 432 obtains (from the database 428) the CV profile from the transaction time information (e.g., a timestamp). Results may be sent back to the electronic device 450 or to some other place where an action is taken (e.g., a control circuit may be used to control or direct an automated vehicle to perform an action).

Figure 5:
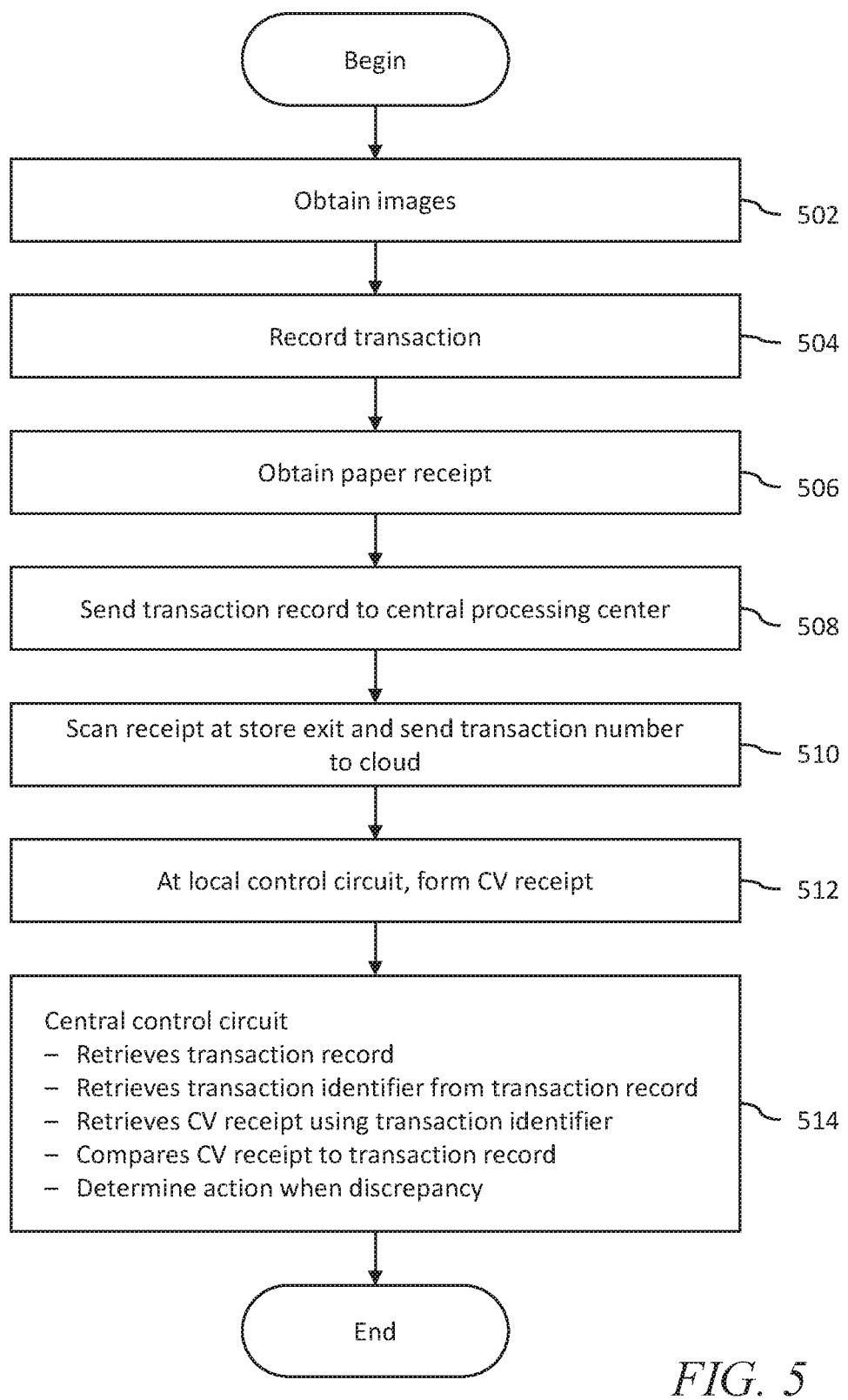
FIG. 5 comprises a flowchart as configured in accordance with various embodiments of these teachings.

Referring now to FIG. 5, another example of the present approaches for reducing or eliminating unpaid items leaving a retail store is described. At step 502, images from cameras are obtained of items in a customer's shopping cart as the customer checks out at a checkout area of a retail store. In aspects, the customer has given approval and/or is aware that the cameras are in use. The instigation of obtaining these images may be when a customer scans a store membership card at the checkout of the retail store.

At step 504, a point-of-sales device record the sales transaction of a customer as the customer purchases the items in their shopping cart at the retail store. The customer and/or an employee may scan the items in to purchase the items and then the customer may pay for the purchase.

At step 506, the customer obtains a paper receipt of the transaction including a transaction number and a barcode encoding the transaction number. The point-of-sales device at the checkout creates an electronic transaction record identified by the transaction number, and the electronic transaction record includes a transaction identifier (a unique alphanumeric identifier). This transaction identifier (created by the point-of-sales device) is not seen or presented to the customer. At step 508, the electronic transaction record is stored at the local database and sent to the central processing center (in the cloud) for storage at a central database also in the cloud.

At step 510, a mobile electronics device is used by an employee of the retail store with the employee stationed at an exit of the retail store. The mobile electronics device 122 includes an electronic sensor that is configured to electronically scan the barcode to obtain the transaction number and send to the central processing center.

At step 512, the local control circuit receives one or more images from the cameras, analyzes the images to determine items in the cart, responsively creates a computer vision (CV) profile or receipt listing the items in the cart, the CV profile, in some examples, being associated with the transaction identifier, and sends the CV profile to the central control circuit and the central control circuit stores the CV profile in a central database.

At step 514, the central control circuit receives the transaction number from the mobile electronics device, retrieves the transaction record from the central database using the transaction number, retrieves the transaction identifier from the transaction record, retrieves the CV profile from the central database using the transaction identifier, compares items on the CV profile to the items on the transaction record, and when there is a discrepancy, determines an action to take.

The action is taken and the action is one or more of: sending an electronic alert to the store employee, sending electronic information to the electronics device showing the discrepancy, sending a control signal to a activate a warning indicator at the exit of the store, or sending a control signal to instruct an automated vehicle to retrieve an unpaid item from a customer and return the item to the retail store.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system, the system comprising:
   a local control circuit coupled to a local database via an electronic network and coupled to a central control circuit central database via the electronic network, wherein the local control circuit and the local database are disposed at a retail store, and wherein the central control circuit and the central database are disposed at a central processing center remote from the retail store, the local control circuit configured to:
receive one or more images from one or more cameras deployed at a checkout area of the retail store, the one or more images depicting items in a shopping cart, each image of the one or more images associated with individual transaction time information;
analyze the one or more images to identify the items in the shopping cart and a checkout register identifier;
generate a computer vision (CV) profile listing the items in the shopping cart, the CV profile including the checkout register identifier;
obtain electronic transaction records associated with the checkout register identifier, wherein a point-of-sales device at a checkout register records a sales transaction of a customer as the customer purchases items at the retail store and creates an electronic transaction record that includes transaction information, a transaction number, and a unique transaction identifier, wherein the customer obtains a receipt of the sales transaction including the transaction number, wherein the unique transaction identifier is not presented in any form to the customer, the unique transaction identifier and the transaction number being separate and different, wherein the transaction number is obtainable via electronic scan of the receipt;
transmit the generated CV profile and the electronic transaction record to the central control circuit;
wherein the central control circuit is configured to receive the CV profile and the electronic transaction record from the local control circuit via the electronic network, and store the CV profile and the electronic transaction record in the central database,
retrieve the electronic transaction record from the central database, obtain the unique transaction identifier from the retrieved electronic transaction record, retrieve the CV profile from the central database using the unique transaction identifier, compare the items on the CV profile to sales transaction items on the electronic transaction record, and responsive to a determination that there is a discrepancy between the items on the CV profile and the sales transaction items, determine an action to take;
wherein the action is one or more of: sending an electronic alert to a mobile device associated with an employee of the retail store, sending electronic information showing the discrepancy to the mobile device associated with the employee of the retail store, sending a control signal to activate a warning indicator at an exit of the retail store, and sending a control signal to instruct an automated vehicle to retrieve an unpaid item from the customer and return the unpaid item to the retail store.

2. The system of claim 1, wherein the electronic information showing the discrepancy includes one or more of a list of unpaid items or images of the unpaid items.

3. The system of claim 1, wherein the local control circuit determines a probability that the images include a predetermined item.

4. The system of claim 1, wherein the local control circuit is further configured to:
receive a message from the point-of-sales device, the message indicating the beginning of the sales transaction at the checkout register;
responsive to the message, control the one or more cameras to begin image capture at the checkout register;
receive another message from the point-of-sales device, the other message indicating the end of the sales transaction; and
responsive to the other message, control the one or more cameras to end the image capture at the checkout register.

5. The system of claim 1, wherein the local control circuit analyzes the one or more images using one or more convolutional neural networks (CNNs).

6. The system of claim 1, wherein the warning indicator is a visual indicator or an audio indicator.

7. The system of claim 1, wherein the automated vehicle is an aerial drone or an automated ground vehicle.

8. The system of claim 1, wherein the items are compared and the action is determined before the customer leaves an area where the point-of-sales device is located.

9. The system of claim 8, wherein the action comprises one or more first actions that are initiated before the customer leaves the area where the point-of-sales device is located and one or more second actions that are initiated upon scanning the receipt at the exit by the mobile electronics device.

10. A method, the method comprising:
receiving, at a local control circuit, one or more images from one or more cameras deployed at a checkout area of a retail store, the one or more images depicting items in a shopping cart, each image of the one or more images associated with individual transaction time information;
analyzing the one or more images to identify the items in the shopping cart and a checkout register identifier associated with the checkout area;
generate a computer vision (CV) profile listing the items in the shopping cart, the CV profile including the checkout register identifier;
obtain electronic transaction records associated with the checkout register identifier from a point-of-sales device, wherein the point-of-sales device records a sales transaction of a customer as the customer purchases items at the retail store and creates an electronic transaction record that includes transaction information, a transaction number, and a unique transaction identifier, wherein the customer obtains a receipt of the sales transaction including the transaction number, wherein the unique transaction identifier is not presented in any form to the customer, the unique transaction identifier and the transaction number being separate and different, wherein the transaction number is obtainable via electronic scan of the receipt;
transmitting the generated CV profile and the electronic transaction record obtained from the point-of-sales device to a central control circuit via an electronic network, wherein the central control circuit is remote from the local control circuit, wherein the central control circuit receives the generated CV profile and the electronic transaction record from the local control circuit and stores the generated CV profile and the electronic transaction record in a central database communicatively coupled to the central control circuit;
wherein the central control circuit retrieves the electronic transaction record from the central database, obtains the unique transaction identifier from the retrieved electronic transaction record, retrieves the generated CV profile from the central database using the unique transaction identifier, and compares the items on the generated CV profile to sales transaction items on the electronic transaction record, and responsive to a determination that there is a discrepancy between the items on the generated CV profile and the sales transaction items, determines an action to take;

wherein the action is one or more of: sending an electronic alert to a mobile device associated with an employee of the retail store, sending electronic information showing the discrepancy to the mobile device associated with the employee of the retail store, sending a control signal to activate a warning indicator at an exit of the retail store, and sending a control signal to instruct an automated vehicle to retrieve an unpaid item from the customer and return the unpaid item to the retail store.

11. The method of claim 10, wherein the electronic information showing the discrepancy includes one or more of a list of unpaid items or images of the unpaid items.

12. The method of claim 10, wherein the local control circuit determines a probability that the images include a predetermined item.

13. The method of claim 10, further comprising:
receiving a message from the point-of-sales device, the message indicating the beginning of the sales transaction at the checkout register;

responsive to receiving the message, controlling the one or more cameras to begin image capture at the checkout register;

receiving another message from the point-of-sales device, the other message indicating the end of the sales transaction; and responsive to receiving the other message, controlling the one or more cameras to end the image capture at the checkout register.

14. The method of claim 10, wherein the local control circuit analyzes the one or more images using one or more convolutional neural networks (CNNs).

15. The method of claim 10, wherein the warning indicator is a visual indicator or an audio indicator.

16. The method of claim 10, wherein the automated vehicle is an aerial drone or an automated ground vehicle.

17. The method of claim 10, wherein the items are compared and the action is determined before the customer leaves an area where the point-of-sales device is located.

18. The method of claim 17, wherein the action comprises one or more first actions that are initiated before the customer leaves the area where the point-of-sales device is located and one or more second actions that are initiated upon scanning the receipt at the exit by the mobile electronics device.

* * * * *